Figure 1:
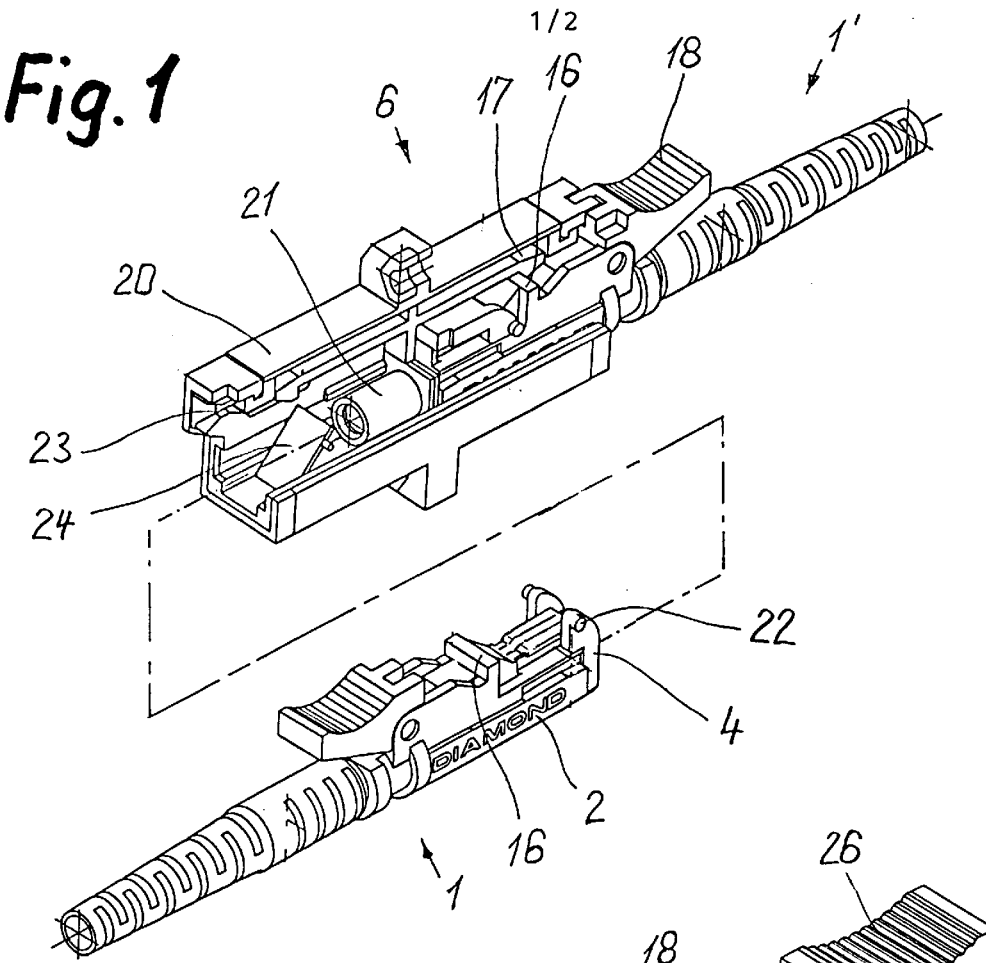

United States Patent [19]
De Marchi

[11] Patent Number: 5,845,036
[45] Date of Patent: Dec. 1, 1998

[54] PLUG PORTION FOR AN OPTICAL FIBER CONNECTOR

[75] Inventor: Silverio De Marchi, Ascona, Switzerland

[73] Assignee: Diamond SA, Losone, Switzerland

[21] Appl. No.: 889,559

[22] Filed: Jul. 8, 1997

[30]  Foreign Application Priority Data

Aug. 8, 1996 [CH] Switzerland ............................ 1948/96

[51] Int. Cl.⁶ .................................................. G02B 6/38
[52] U.S. Cl. ................................ 385/139; 385/70; 385/77
[58] Field of Search .................... 385/55, 58, 60, 385/70, 77, 139; 439/142

[56]  References Cited

U.S. PATENT DOCUMENTS

| | | |
|---|---|---|
| 4,713,017 | 12/1987 | Pesapane .................................. 439/142 |
| 5,348,487 | 9/1994 | Marazzi et al. ......................... 439/138 |
| 5,363,460 | 11/1994 | Marazzi et al. ............................ 385/70 |

*Primary Examiner*—John D. Lee
*Assistant Examiner*—Juliana K. Kang
*Attorney, Agent, or Firm*—Shoemaker and Mattare, Ltd.

[57]  ABSTRACT

A plug portion (1) for an optical plug connector has a plug casing (2) in which at least one connector pin (3) is held. A protective flap (4) for protection of the connector pin is pressed under spring tension against the face (7) of the plug casing. The protective flap is mounted to pivot and slide on an approximately linear guide path (5) in such a way that, on insertion of the plug portion into a sleeve portion, it is able to move from a closed position on the face of the plug casing into an opened position that is set back in relation to the face (7). In order to pre-load the protective flap under spring tension throughout its entire slide- and pivoting-travel, a compression spring is arranged on the plug casing (2) approximately parallel to the guide path (5), said compression spring impinging either directly or indirectly upon the protective flap (4) above the plane of the guide path (5) between the closed position and the opened position.

7 Claims, 2 Drawing Sheets

PLUG PORTION FOR AN OPTICAL FIBER CONNECTOR

The invention concerns a plug portion for an optical fiber connector according to the preamble to patent claim 1. These types of plug portions are distinguished in that the delicate connector pin is always protected by the protective flap when in the unplugged state, wherein the protective flap is only opened during the plugging procedure through co-ordination with a corresponding part of the sleeve portion. For reasons of space, it is here not sufficient that the protective flap is merely pivoted upwards, but after attaining the maximum pivot movement, it must then be retracted in relation to the face of the plug casing.

A plug portion of a related type has been disclosed in EP-A570 652. Because, in the unplugged state, the protective flap is required to reliably close the face of the plug casing, pre-loading under spring tension of the protective flap into the closed position was here already state of the art. This pre-loaded spring tension is created with a spring-lug on the protective flap, said spring-loaded lug pressing against the face of the plug casing, the spring force of said spring-loaded lug having to be overcome when the protective cover is pivoted upwards. A disadvantage of this solution is that the spring-loaded lug is effective up to a pivot angle of approximately 30° to 45°. Subsequently, the spring-loaded lug passes a dead-point, beyond which the protective flap is no longer under pre-loaded spring tension. In particular, the protective flap is no longer under pre-loaded spring tension on the approximately linear sliding path after attaining the full pivoting movement. If a plug portion is now withdrawn inadvertently from the sleeve portion, or if, in the unplugged state, the protective flap is tampered with, this protective flap can remain in the opened position.

It is thus a purpose of the invention to create a plug portion of the type mentioned in the introduction, the protective flap of which is under spring loading not only within the range of the pivoting movement but also throughout the complete range of the sliding movement into the closed position. According to the invention, this purpose is fulfilled with a plug portion possessing the features in claim 1. The compression spring, arranged approximately parallel to the guide path, permits impingement on the protective flap throughout its entire travel, and in particular on its approximately linear sliding travel. Because the compression spring impinges on the protective flap above the plane of the guide path, a leverage effect is simultaneously exerted onto the protective flap, said leverage effect also transmitting the pre-loaded spring tension throughout the total pivoting movement. The problem of applying pre-loaded spring tension throughout a combined movement sequence is thus solved in a simple way.

It is of particular advantage if the compression spring is mounted in a groove and/or in a hollow channel on the plug casing, wherein the spring impinges upon the protective cap via a slider guided within the groove and/or hollow channel. The slider enables unproblematic transmission of the spring force, in particular on that section of travel where the protective flap travels on a curved path. The protective flap can, with that, possess a lever arm, the free end of said arm co-ordinating with the face of the slider above the plane of the guide path in each position of the protective flap. With that, the free end of the lever arm can roll off the face and/or relative movements between lever arm and face are also possible.

Preferably, the slider is formed as an approximately U-shaped stirrup, the compression spring being mounted between the members of said stirrup. Thus, on the one hand, satisfactory guidance of the slider is attained, and on the other hand, the slider can protect the compression spring from external influences if said spring is mounted in an open groove.

The state-of-the-art plug portions mentioned in the introduction possess a pair of lateral linkage lugs on the protective cover which engage in a pair of parallel guide grooves in the plug casing. Jamming of the protective flap is thus prevented. A particularly space-saving and advantageous arrangement will here result if the compression spring is mounted between both the guide grooves. With that, the compression spring is accommodated in a relatively protected way and impinges upon the protective cap on a plane between both the linkage lugs, so that jamming is impossible.

The state-of-the-art plug portions are, apart from that, equipped with a locking strip as a continuation of the guide grooves onto which a locking catch on the sleeve side can snap. A release lever to release the locking catch is mounted on the plug casing. Preferably, the compression spring essentially extends over the entire length of the plug casing, to pass through the locking strip to a point beneath the release lever. By means of the full exploitation of the constructional length of the plug casing, a compression spring can be selected with advantageous spring characteristics. The compression spring can run through a hollow channel in the region of the locking strip, said hollow channel simultaneously serving as positional security for the compression spring. The compression spring is not visible beneath the release lever, and is protected.

Preferably, the compression spring is a coil spring. A spike engaging inside the compression spring and arranged on the plug casing serves as a counter-bearing.

Figure 2:
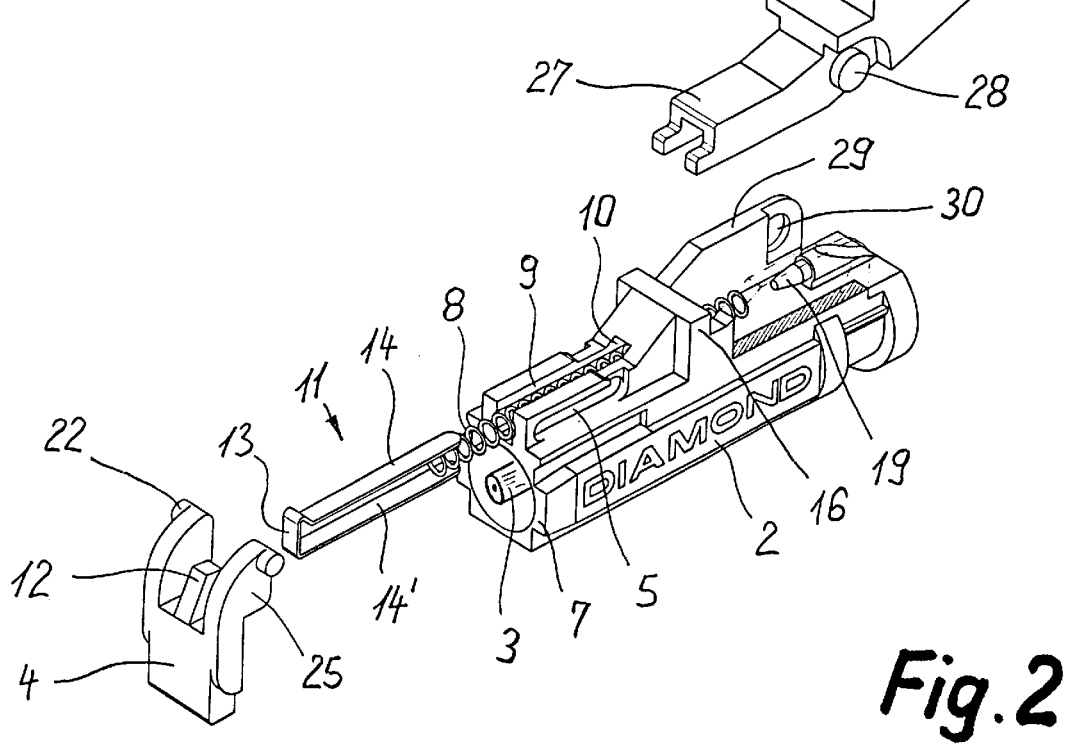
Figure 3:
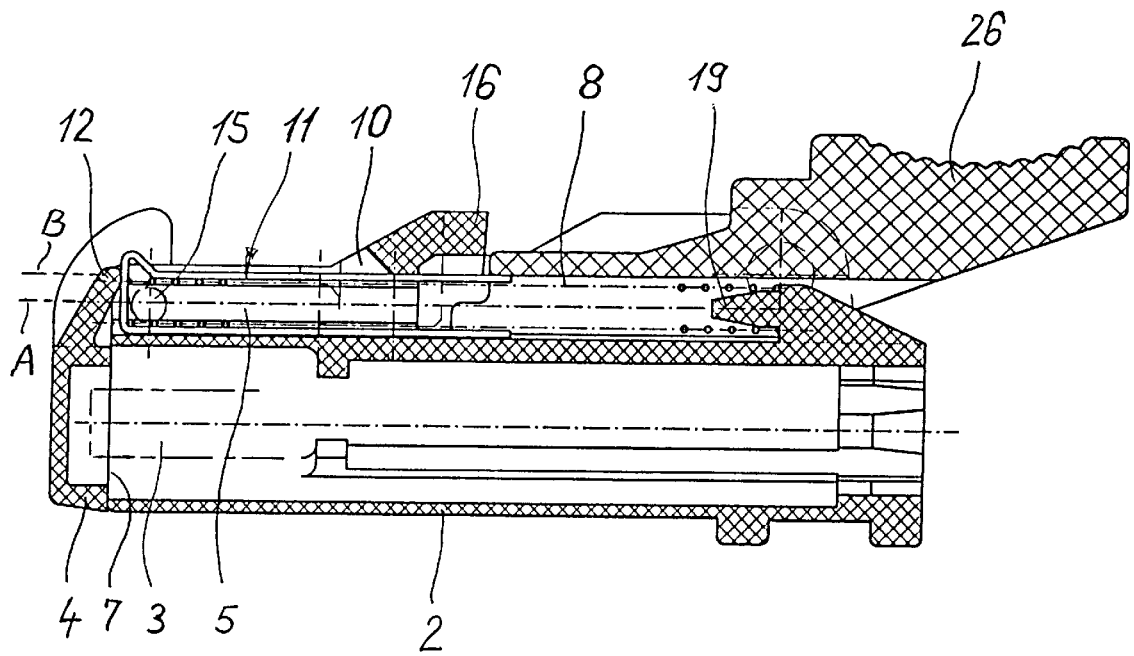
Figure 4:
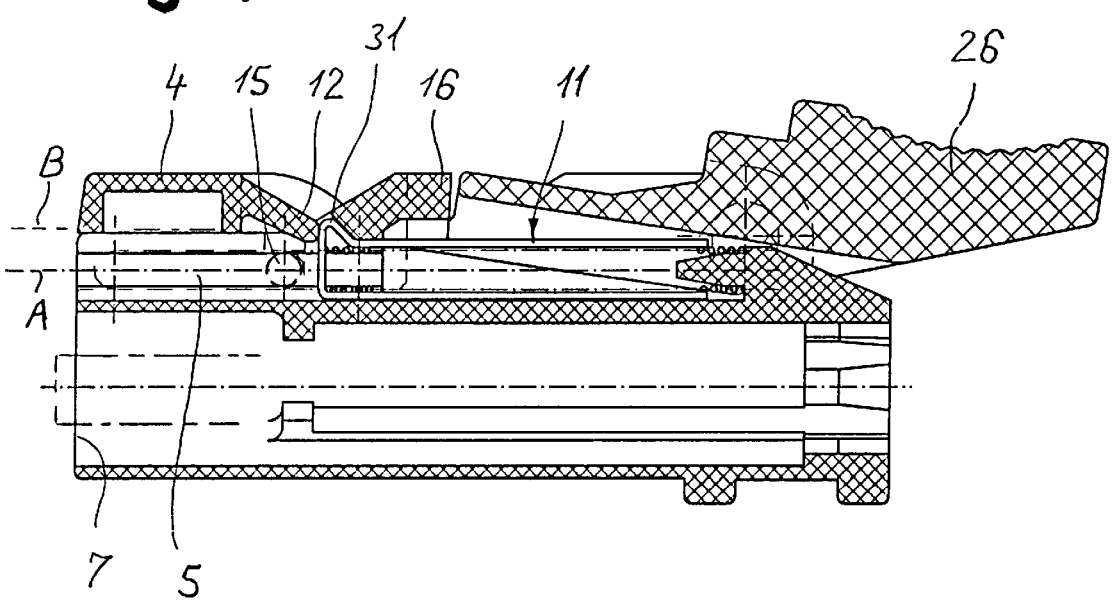

An embodiment of the invention is represented in the drawings and is more closely described in the following: namely, FIG. 1 a perspective representation of a plug connector comprising a sleeve portion and two plug portions;

FIG. 2 a perspective representation of a plug portion with the essential components prior to assembly;

FIG. 3 a cross section through the plug portion according to FIG. 2 in an unplugged state, and FIG. 4 a cross section through the plug portion according to FIG. 2 in a plugged-in state.

On the basis of FIG. 1, the principle construction of a related plug connector is first of all explained. The two plug portions 1 and 1' can be inserted from both sides into a sleeve portion 6, as shown in a partially cut-away representation. Each plug portion has a plug casing 2 in which at least one connector pin 3 (FIG. 2) is held. A protective flap 4 is mounted on the plug casing to be able to pivot and slide in order to protect the face of the connector pin. Apart from that, a release lever 18 is mounted on the plug casing and equipped with a locking strip 16.

The sleeve portion 6 has a sleeve casing 20 in which the actual plug sleeve 21 is held. A locking catch 17 is arranged in the sleeve casing on each plug side, said locking catch snapping in behind the locking strip 16 when the plug portion is fully inserted and in this way securing said plug portion. To release the lock, the release lever 18 must be activated, wherein the locking catch 17 is raised. When the plug is unplugged, the opening of the sleeve 21 is covered by a screen 24 so that light cannot be emitted.

On plugging in the plug portion into the sleeve portion, the control lugs 22 on the protective flap 4 co-ordinate with a corresponding control path 23 on the sleeve portion 6. The control path runs in such a way that the control lugs 22 are first of all pressed downwards so that the protective flap 4 pivots upwards. Subsequently, the control lugs 22 reach a limit-stop position in the control path 23 so that the opened protective flap remains at rest in relation to the sleeve casing 20, while the plug casing 2 is pushed further until the locking catch 17 snaps in. With that, in relation to the plug casing, the protective flap 4 is obviously retracted behind the plane of the face of the plug casing. The connector pin now penetrates into the sleeve 21 and is there in exact alignment with an adjacent connector pin. This plugged-in position with retracted protective flap is represented on the right-hand side of the sleeve portion, in FIG. 1. Consult EP-A-570 652 for further details.

FIG. 2 shows a plug portion (without kink-protection) with the components that serve to pre-load the protective flap. The protective flap has a side wing 25 on which the control lugs 22 are arranged, pointing outwards. A lever arm 12 extends, inclined slightly backwards, between the side wings 25. Two linkage lugs 15 are arranged on the inside of the side wings 25, pointing towards one another, said linkage lugs each engaging in an approximately linear guide path 5 on the sleeve casing. The linkage lugs 15 are not directly visible in FIG. 2. Their relative position is suggested in FIG. 3 and 4, however.

The release lever 18 comprises a gripping piece 26 and the actual activating lever 27. The release lever 18 is mounted between two side walls 29 by means of lateral mounting lugs 28, wherein the mounting lugs snap into openings 30. For clarity, the right-hand side wall is cut away in the representation.

A groove 9 has been recessed into the plug casing between the two guide paths 5, said groove becoming a hollow channel 10 in the area of the locking strip 16. A spike 19 is arranged in the continuation of this hollow channel between the two side walls 29.

This spike serves as a counter bearing for the coil compression spring mounted in the groove 9, respectively the hollow channel 10. The compression spring takes effect on a slider 11 formed as an approximately U-shaped stirrup. The two stirrup members 14 and 14' extend over the compression spring, while the face 13 of the stirrup rests against the end of the lever arm 12.

FIG. 3 shows a plug portion wherein the protective flap 4 is pressed under pre-loaded spring tension against the face 7 of the plug casing. With that, the slider 11 impinges on the end of the lever arm 12 on a plane B above the mid-plane A of the guide path 5, respectively above the rotational axis of the linkage lugs 15. In this way, a torque is attained by means of the leverage, said torque taking effect on the protective flap 4 in an anti-clockwise direction as shown in the figure.

Apart from that, it is evident from FIG. 3 that the length of both stirrup members 14, 14' is dimensioned in such a way that they also penetrate the hollow channel 10 even when the protective cap is closed. In the area of the groove, the compression spring 8 is accordingly not only covered by the stirrup, but the stirrup also serves to hold the compression spring securely in position. The slider 11 can therefore only be removed if the protective cap is also dismantled; however, this is only possible in the position according to FIG. 4.

FIG. 4 shows the protective flap 4 in the position that, under normal conditions, is only assumed inside the sleeve portion. With that, the protective flap runs approximately parallel to the connector pin 3 and the linkage lugs 15 have reached the rear end of the guide path 5. In this position, the linkage lugs can be extracted upwards in order to dismantle the protective flap.

The slider 11 is totally retracted, wherein the face 13 of the slider continues to make contact with the end of the lever arm 12. The distance between the contact plane B and the path level A is slightly greater than in the position according to FIG. 3. For this reason, the face 13 also has a slightly raised, cross-sectionally nose-shaped section 31.

In the position shown in FIG. 4 with the plug portion inserted, the locking catch engaging in the locking strip 16 has the effect that the plug remains in its inserted position and accordingly that the protective flap 4 maintains its opened position. As soon as the gripping piece 26 is depressed, the locking strip 16 is released by the locking catch. On withdrawal of the plug portion, the compression spring 8, via the slider 11, pushes the protective flap in its guide path 5 forwards in relation to the plug casing 2, beyond the face 7. Because the protective flap 4 rests against a midpoint bridging piece within the sleeve portion, the entire plug casing is in fact pushed out of the sleeve portion by the force of the compression spring, so that only negligible pulling force is required. This push-out movement extends throughout the length of the guide path 5. The protective flap will then continue to assume a position parallel to the connector pin 3, but protrudes over the face 7, as at the end of the pivoting movement. On further withdrawal of the plug portion, the control lugs 22 reach that section of the control path 23 that induces pivoting of the protective flap. The slider 11 then pushes the lever arm 12 further forwards until the protective flap once again assumes the position according to FIG. 3.

I claim:

1. Plug portion (1) for an optical plug connector with a plug casing (2) in which at least one connector pin (3) is held, as well as with a protective flap (4) for protection of the face of the connector pin, wherein the protective flap is mounted on the plug casing (2) to be able to pivot and slide on an approximately linear guide path (5) in such a way that, on insertion of the plug portion into a sleeve portion (6), said protective flap is able to move out of a closed position on the face (7) of the plug casing into an open position, said open position being displaced to the rear in relation to the face, characterized in that, approximately parallel to the guide path (5), a compression spring (8) is arranged on the plug casing (2), said compression spring impinging on the protective flap (4) above the plane of the guide path (5) between the closed position and the open position directly or indirectly, and pre-loading said protective flap (4) into the closed position.

2. Plug portion according to claim 1, characterized in that the compression spring (8) is mounted in a groove (9) and/or in a hollow channel (10) on the plug casing (2) and that said compression spring impinges upon the protective flap (4) via a slider (11) guided within the groove and/or hollow channel.

3. Plug portion according to claim 2, characterized in that the protective flap (4) possesses a lever arm (12), the free end of said lever arm co-ordinating above the plane of the guide path with the face (13) of the slider (11) in every position of the protective flap.

4. Plug portion according to claim 3, characterized in that the slider (11) is formed as an approximately U-shaped stirrup and that the compression spring (8) is mounted between the members (14, 14') of the stirrup.

5. Plug portion according to claim 1 wherein the protective flap (4) possesses a pair of lateral linkage lugs (15), said linkage lugs engaging in a pair of parallel guide grooves (5) on the plug casing (2), characterized in that the compression spring (8) is mounted between both the guide grooves.

6. Plug portion according to claim 5, the plug casing (2) of which, as a continuation of the guide grooves (5), possesses a locking strip (16) on which a locking catch (17) on the sleeve portion can snap, as well as a release lever (18) mounted on the plug casing (2) so as to be able to pivot for release of the snapped-in locking catch, characterized in that the compression spring (8) extends substantially over the entire length of the plug casing (2) through the locking strip (16) to a position beneath the release lever (18).

7. Plug portion according to claim 1, characterized in that a spike (19) engaging within the compression spring (8) is arranged on the plug casing as the counter bearing for the compression spring (8).

* * * * *